United States Patent [19]

Yoshida

[11] Patent Number: 4,865,749
[45] Date of Patent: Sep. 12, 1989

[54] METHOD AND APPARATUS FOR PURIFYING AIR AND WATER

[76] Inventor: Yasunobu Yoshida, 25-8 Torikoe 1-chome, Taito-ku, Tokyo, Japan

[21] Appl. No.: 173,206

[22] Filed: Mar. 25, 1988

[51] Int. Cl.$^4$ .................. C02F 1/78; B01D 53/00
[52] U.S. Cl. .................. 210/742; 210/748; 210/760; 210/765; 210/169; 210/188; 55/235; 55/279
[58] Field of Search ............... 210/748, 760, 742, 765, 210/169, 188, 199; 422/24, 122; 55/235, 459.1, 279

[56] References Cited

U.S. PATENT DOCUMENTS

| | | | |
|---|---|---|---|
| 835,886 | 11/1906 | Gunn | 55/279 |
| 2,009,230 | 7/1935 | Hartman | 210/760 |
| 3,856,671 | 12/1974 | Lee et al. | 210/760 |
| 3,920,547 | 11/1975 | Garrison et al. | 210/748 |
| 3,970,567 | 7/1976 | Lowther | 204/176 |
| 4,204,955 | 5/1980 | Armstrong | 210/760 |
| 4,224,154 | 9/1980 | Steininger | 210/169 |
| 4,225,431 | 9/1980 | De Longe | 210/760 |
| 4,256,574 | 3/1981 | Bhargava | 210/760 |
| 4,336,223 | 6/1982 | Hillman | 210/748 |
| 4,750,917 | 6/1988 | Fuji | 55/279 |

FOREIGN PATENT DOCUMENTS 5158105 12/1980 Japan .................. 210/188

Primary Examiner—Richard V. Fisher
Assistant Examiner—Coreen Y. Lee
Attorney, Agent, or Firm—Jordan and Hamburg

[57] ABSTRACT

The disclosed method and apparatus simultaneously purifies air and water contained in an indoor institution such as an indoor swimming pool facility. Air from the interior of the institution is first treated in a cyclone to remove dust, bacteria and odors, then mixed with ozone generated from a separate air source to form an air-ozone mixture which is distributed in the form of fine bubbles in an air/water contact sterilizing chamber. Water from the pool of water in the indoor institution is filtered and transferred to the sterilizing chamber. In the sterilizing chamber, contact of the filtered water and air-ozone mixture acts to simultaneously purify both. The purified air is returned to the indoor institution after moisture removal, ozone elimination and temperature adjustment. Similarly, the purified water is returned to the pool of water after ozone elimination, temperature adjustment and chlorination.

16 Claims, 2 Drawing Sheets

METHOD AND APPARATUS FOR PURIFYING AIR AND WATER

BACKGROUND OF INVENTION

1. Field of Invention

The present invention relates to a method and apparatus for purifying air and water, particularly, in various sports institutions having indoor swimming pools.

2. Description of the Prior Art

The conventional systems for purifying indoor air include a filter for filtrating the air, and a cyclone for removing dust, bacteria and bad odors in the air by the use of sprayed water and the like. The conventional systems for purifying water in water reservoirs such as water tanks, swimming pools and the like include a filtrating apparatus for removing dust and the like in the water.

The filter is troublesome in maintenance since it is frequently subjected to clogging. The cyclone is less satisfactory in the degree of air purification and cannot be applied to indoor sports institutions, much less the indoor swimming pools which should be subjected to the purification of air containing chlorine gas. The water filtrating systems cannot be used to remove bad odors.

In the prior art, the purifications of air and water are performed by separate purifying systems. This results in increase of the initial and running costs.

SUMMARY OF INVENTION

It is therefore an object of the present invention to provide a method and apparatus for simultaneously purifying air and water with an increased degree of air and water purification.

To this end, the present invention provides a method for purifying air and water, comprising the steps of introducing air from the interior of an indoor institution into a cyclone, mixing the air from the cyclone with ozone gas, discharging the mixture of air and ozone in the form of fine bubbles through water in a sterilizing chamber, feeding the air passed through the water into the indoor institution, introducing water from a pool into the sterilizing chamber through a filter and feeding the water from the sterilizing chamber into the pool.

The present invention further provides an apparatus for purifying air and water, comprising a cyclone for receiving air from the interior of an indoor institution, an air distributor for discharging fine bubbles in water, an ozonizer for generating ozone gas, the ozonizer being connected with a first piping connecting the cyclone with the air distributor, the air distributor being disposed within the water in the sterilizing chamber, the top of the sterilizing chamber communicating with the interior of the indoor institution, a second piping for feeding water from a pool into the sterilizing chamber through a filter and a third piping for returning the water from the sterilizing chamber to the pool.

In such an arrangement, the air from the interior of the indoor institution is introduced into the cyclone wherein dust in the air is removed. After discharge from the cyclone, the air is mixed and sterilized with ozone gas. The mixture of air and ozone is then discharged into the water within the sterilizing chamber in the form of fine bubbles. Therefore, the air can be sterilized and deodorized by the water and ozone bubbles. After passage through the water, the air is fed into the interior of the indoor institution. Such a cycle will be repeated. In addition, water from the pool is subjected to dust removal through the filter and then introduced into the sterilizing chamber wherein the water is sterilized and deodorized by the ozone bubbles. Thereafter, the sterilized and deodorized water is returned to the pool. Such a cycle will be repeated.

As will be apparent from the foregoing, both the air and water can be simultaneously purified well under the action of air-ozone bubbles in the water. Therefore, the method and apparatus of the present invention can be applied well to indoor sports institutions and the like. Further, the present invention can be applied to indoor swimming pools in which air containing chlorine gas should be purified. Further, since the air and water can simultaneously be purified by the system of the prevent invention, both the initial and running costs of the system can be reduced.

DETAILED DESCRIPTION OF PREFERRED EMBODIMENT

The present invention will now be described by way of example with reference to the drawings and in connection with one preferred embodiment of the present invention.

Figure 1:
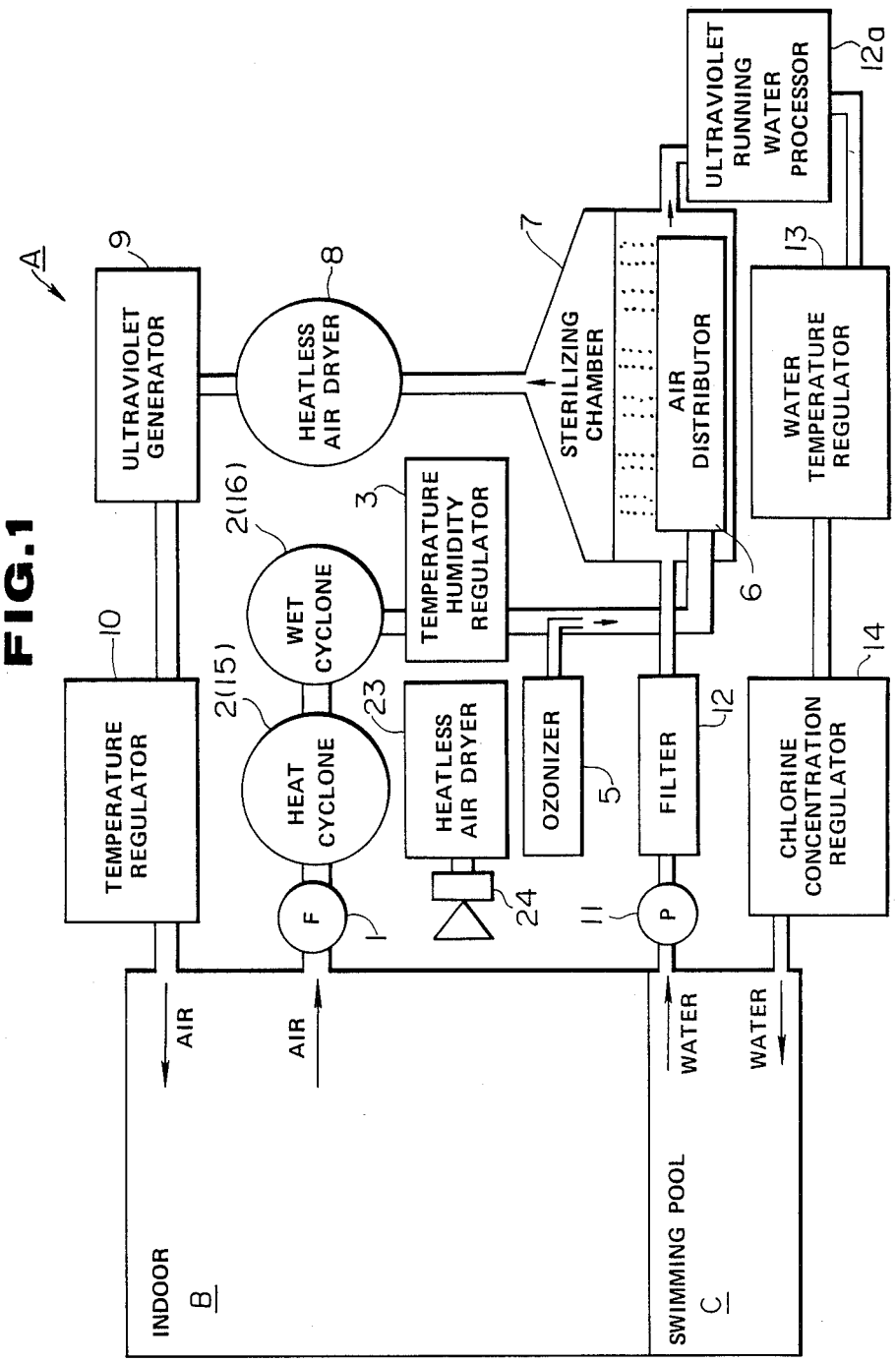
FIG. 1 is a schematic diagram illustrating the general arrangement of one embodiment of an air and water purifying system according to the present invention.
Figure 2:
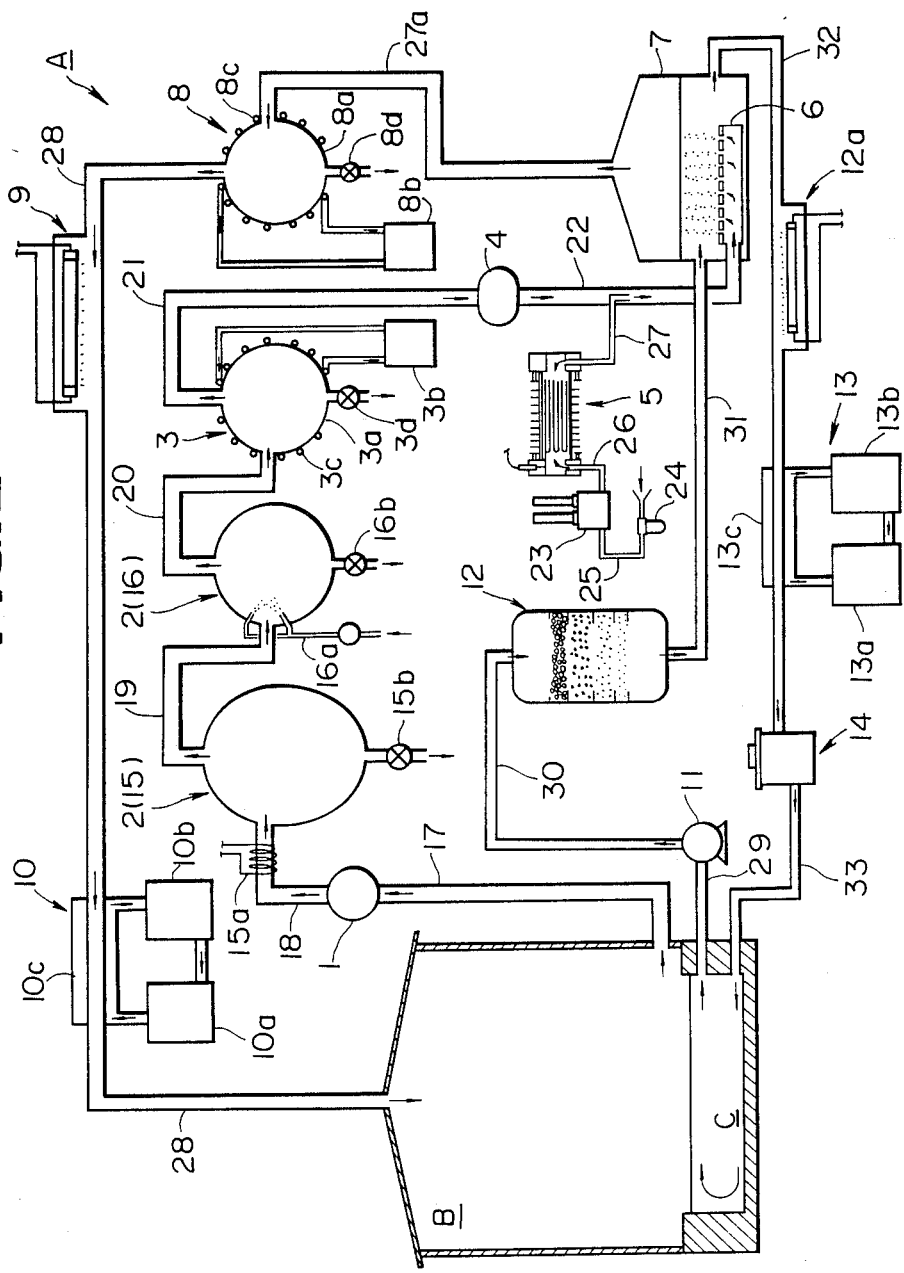
FIG. 2 is a view showing in more detail the arrangement of the system shown in FIG. 1.

Referring now to FIGS. 1 and 2, there is shown a system for purifying air and water, which is denoted generally by "A". The purifying system A comprises a fan 1 for drawing air from the interior of an indoor institution B, a cyclone 2, a temperature and humidity regulator 3, a Roots blower 4, an ozonizer 5, an air distributor 6, a sterilizing chamber 7, a heatless air dryer 8, an ultraviolet generator 9, a temperature regulator 10, a pump 11 for drawing water out of a swimming pool C, a filter 12, an ultraviolet running water processor 12a, a water temperature regulator 13 and a chlorine concentration regulator 14. The cyclone 2 comprises a heat cyclone 15 and a wet cyclone 16.

The fan 1 is connected with the indoor institution B through a piping 17 and with the heat cyclone 15 through a piping 18.

The heat cyclone 15 includes a heater 15a for heating the air fed from the indoor institution by the fan 1. The heat cyclone 15 serves to swirl the fed air and to remove dust in the air. The removed dust are discharged outwardly through a valve 15b. The heat cyclone 15 is of substantially a spherical configuration which can be strengthened relative to pressure and made compact in construction. Since the heat cyclone 15 is provided with the heater 15a, it can reduce the work load of the fan 1 by expanding the air to increase the velocity of the air flow and at the same time can sterilize the air under heat. The heat cyclone 15 is connected with the wet cyclone 16 through a piping 19.

The wet cyclone 16 includes a sprayer 16a which is adapted to spray water into the swirled air flow in the wet cyclone 16 such that dust, bacteria and bad odors will be removed from the air. Dust and the like are then discharged outwardly through a valve 16b. The shape of the wet cyclone 16 is of a spherical configuration.

The wet cyclone 16 is connected with the temperature and humidity regulator 3 through a piping 20.

The temperature and humidity regulator 3 comprises a spherical cyclone 3a, a cooler 3b and a cooling piping 3c. The cooling piping 3c is wound around the outer wall of the cyclone 3a and connected with the cooler 3b. After passage through the cooling pipe 3c, the cooling water will be returned to the cooler 3b. Thus, the cyclone 3a itself is cooled to remove moisture from the air. The removed moisture is then discharged outwardly through a valve 3d. The cyclone 3a is connected with the Roots-blower 4 through a piping 21.

The Roots-blower 4 is connected with the air distributor 6 through a piping 22.

The ozonizer 5 is adapted to generate ozone gas by converting air into ozone gas under the action of silent discharge. Depending on the properties of air to be converted into ozone gas, $NO_x$ may be created. It is therefore preferred to use dry air having a temperature equal to 60° C. For this purpose, the present invention utilizes a heatless air dryer 23 and a filter 24. The heatless air dryer 23 includes a twin-body cylinder into which a drying agent having a high affinity for moisture is charged and compacted.

The filter 24 is connected with the heatless air dryer 23 through a piping 25 while the heatless air dryer 23 is connected with the ozonizer 5 through a piping 26. The ozonizer 5 is also connected with the piping 22 through a piping 27. Air to be converted into ozone gas is supplied from the ambient air through the filter 24 wherein dust in the ambient air are removed. After the dust removal, the air is fed into the heatless air dryer 23. In the heatless air dryer 23, the air is conditioned to be dry air having a temperature equal to 60° C. and then fed into the ozonizer 5 wherein the air is converted into ozone gas.

The air distributor 6 includes a plurality of pores for generating fine bubbles when the air is passed into the water through the pores. The diameter of the pores is preferably equal to or less than 10 microns. The air distributor 6 may be of a tubular or plate configuration.

The sterilizing chamber 7 is in the form of an enclosed tank housing a body of water. The air distributor 6 is positioned on the bottom of the sterilizing chamber 7. The top of the sterilizing chamber 7 is connected with the heatless air dryer 8 through a piping 27a.

The heatless air dryer 8 comprises a spherical cyclone 8a, a cooler 8b and a cooling pipe 8c. The cooling pipe 8c is wound around the outer wall of the cyclone 8a and connected with the cooler 8b. After passage through the cooling pipe 8c, the cooling water is returned to the cooler 8b. Thus, the cyclone 8a can be cooled to remove mositure from the air.

The cyclone 8a is connected with the indoor institution B through a piping 28 in the midway of which the ultraviolet generator 9 and the temperature regulator 10 are disposed.

The ultraviolet generator 9 is adapted to cause the ozone gas to disappear in the air under the influence of ultraviolet rays created by an ultraviolet lamp (not shown) and at the same time to oxidize the ozone gas for sterilization under the action of ultraviolet rays.

The temperature regulator 10 comprises a heater 10a, a cooler 10b and a piping 10c. The temperature regulator 10 is adapted to heat or cool the air passed through the piping 28 to adjust the temperature of the air.

The pump 11 is connected with the swimming pool C through a piping 29 and with the filter 12 through a piping 30.

The filter 12 is of a multi-stage type which is adapted to separate dust in water gradually from larger sizes to smaller sizes as the flow of water is moving from the top to the bottom of the filter 12. A reversing device may preferably be provided to prevent any clogging in the filter 12.

The filter 12 is connected with the sterilizing chamber 7 through a piping 31. The sterilizing chamber 7 is in turn connected with the chlorine concentration regulator 14 through a piping 32. The midway portion of the piping 32 includes the ultraviolet running water processor 12a and the water temperature regulator 13.

The ultraviolet running water processor 12a is adapted to cause the ozone gas in the water to disappear under the action of ultraviolet rays from an ultraviolet lamp located within the water and at the same time to oxidize the ozone gas for water sterilization by the use of ultraviolet rays.

The water temperature regulator 13 comprises a heater 13a, a cooler 13b and a piping 13c. The water temperature regulator 13 is adapted to heat or cool the water passed through the piping 32 to adjust the temperature of the water.

The chlorine concentration regulator 14 is adapted to maintain the concentration of chlorine in the swimming pool C at 0.4 ppm and connected with the swimming pool C through a piping 33.

The purifying system A of the illustrated embodiment functions to purify the air in the indoor institution B and the water in the swimming pool C in the following manner:

Air from the indoor institution B is introduced into the heat cyclone 15 through the fan 1, in which the air is subjected to thermal sterilization and dust removal. The air is then discharged out of the cyclone 15 and then introduced into the wet cyclone 16 wherein the dust removal, sterilization and deodorization of the air are performed. The air is thereafter discharged out of the wet cyclone 16 and introduced into the cyclone 3a of the temperature and humidity regulator 3 wherein the moisture is removed from the air.

The air from the cyclone 3a is fed to the air distributor 6 by the Roots-blower 4 while being mixed with ozone gas from the ozonizer 5. Therefore, that air is discharged from the air distributor 6 into the water while being sterilized by the ozone gas.

The mixture of air and ozone gas delivered through the pores of the air distributor 6 forms fine bubbles in the water within the sterilizing chamber 7. As a result, the air can be subjected to sterilization, deodorization and dust removal under the influence of the water and ozone bubbles.

The air passed through the water in the sterilizing chamber 7 and the residual ozone gas not dissolved in the water are introduced from the top of the sterilizing chamber 7 into the cyclone 8a of the heatless air dryer 8 wherein moisture is removed from the mixture of air and ozone. After discharge from the cyclone 8a, the residual ozone gas is caused to disappear under the action of ultraviolet rays from the ultraviolet generator 9.

After passage through the ultraviolet generator 9, the air is appropriately adjusted in temperature by the temperature regulator 10 and then fed into the indoor institution B. Such a cycle will be repeated.

Water is moved from the swimming pool C into the filter 12 by means of the pump 11 such that dust in the water will be removed by the filter 12. The water is fed from the filter 12 to the sterilizing chamber 7 wherein the water is sterilized and deodorized by the ozone bubbles.

The water discharged from the sterilizing chamber 7, with the residual ozone gas therein, is moved into the ultraviolet running water processor 12a wherein the residual ozone gas is caused to disappear. After passage through the ultraviolet running water processor 12a, the water is adjusted to an appropriate temperature by the water temperature regulator 13 and then fed into the chlorine concentration regulator 14 wherein the concentration of chlorine in the water is regulated. Thereafter, the water is returned to the swimming pool C. Such a cycle will be repeated.

The system A of the present invention can remove chlorine gas evaporating from the water of the swimming pool C into the air within the indoor B by using the ozone gas.

The present invention is not limited to the configuration and arrangement of the aforementioned and illustrated embodiment but may take any of various configurations or arrangements without departing from the scope of the invention. For example, the cyclone may be of a cylindrical configuration generally known in the art. The number of cyclones may be selected without limitation. The filter may be of any one of various types.

What is claimed is:

1. A method for simultaneously purifying water in a swimming pool disposed in a building structure and air in the interior of said building structure comprising:
    passing air from the interior of said building structure through a cyclone;
    mixing the air passed through the cyclone with ozone gas to form an air-ozone mixture;
    filtering said water from said swimming pool;
    introducing said filtered water into a sterilizing chamber;
    passing said air-ozone mixture into and through the filtered water in said sterilizing chamber in the form of bubbles and thereby effecting contact between the air-ozone mixture and the filtered water in said sterilizing chamber such as to provide simultaneous purification thereof;
    feeding the purified air which passed into and through said filtered water back into said building structure;
    feeding the purified and filtered water from said sterilizing chamber back into said swimming pool; and
    continuing the aforesaid steps to thereby provide for recycling of the air and water to and from the interior of said building structure and said swimming pool as said air and water are simultaneously purified.

2. A method as defined in claim 1 further comprising regulating the temperature of the air from said sterilizing chamber before feeding the air back into said building structure.

3. A method as defined in claim 1 further comprising sterilizing the air from said sterilizing chamber with ultraviolet rays before feeding the air back into said building structure.

4. A method as defined in claim 1 further comprising regulating the moisture in the air from said sterilizing chamber before feeding the air back into said building structure.

5. A method as defined in claim 1 further comprising processing the filtered water from said sterilizing chamber with ultraviolet rays before feeding the water back into said swimming pool.

6. A method as defined in claim 1 further comprising regulating the temperature of the water from said sterilizing chamber before feeding the water back into said swimming pool.

7. A method as defined in claim 1 further comprising regulating the concentration of chlorine in the water from said sterilizing chamber before feeding the water back into said swimming pool.

8. A method as defined in claim 1, wherein said step of passing air from the interior of the said building structure through a cyclone comprises passing the air through a heat cyclone to remove dust from the air and then passing the air through a wet cyclone to remove dust, bacteria and odors from the air.

9. A method as defined in claim 1 further comprising filtering a separate source of air, drying said separate source of filtered air and converting said filtered, dried air to ozone to form said ozone gas.

10. A method for purifying water in a swimming pool disposed in a building structure and air in the interior of said building structure comprising:
    passing air from the interior of said building structure through a cyclone to remove dust, bacteria and odors from said air;
    mixing the air passed through said cyclone with ozone gas to form an air-ozone mixture;
    filtering said water from said swimming pool;
    introducing said filtered water into a sterilizing chamber;
    contacting said air-ozone mixture in the form of bubbles with the filtered water in said sterilizing chamber to simultaneously sterilize said filtered water and the air in said air-ozone mixture;
    returning the purified air to the interior of said building structure; and
    returning the filtered and sterilized water to said swimming pool.

11. An apparatus for purifying water in a swimming pool disposed in a building structure and air in the interior of said building structure comprising:
    delivery means for delivering air from said building structure;
    cyclone means for receiving said air from said delivery means;
    an ozonizer for generating ozone gas from a separate air source;
    a sterilizing chamber for simultaneously purifying air and water therein;
    first conduit means for feeding water from said swimming pool into said sterilizing chamber;
    filter means connected to said first conduit means between said swimming pool and said sterilizing chamber for filtering water fed through said first conduit means;
    second conduit means for returning water from said sterilizing chamber back to said swimming pool;
    air distribution means arranged within said sterilizing chamber for distributing bubbles of an air mixture into the water in said sterilizing chamber;
    third conduit means connecting said cyclone means and said air distribution means for passing air from said cyclone means to said air distribution means;
    fourth conduit means connecting said ozonizer and said third conduit means for mixing ozone with the air passing through said third conduit means to form said air mixture; and fifth conduit means connecting said sterilizing chamber with the interior of said building structure for passing the air mixture distributed through the water in said sterilizing chamber back to the interior of said building structure.

12. An apparatus as defined in claim 11, wherein said cyclone means comprises a heat cyclone connected to the interior of said building structure for removing dust from the air received from said interior, a wet cyclone connected to said heat cyclone for removing dust, bacteria and odors from air received from the heat cyclone, and a temperature and humidity regulator connected to said wet cyclone.

13. An apparatus as defined in claim 11 further comprising a moisture removal means in said fifth conduit means, an ultraviolet generator on said fifth conduit means for oxidizing ozone gas in said air mixture to further sterilize said air mixture, and an air temperature regulator in said fifth conduit means.

14. An apparatus as defined in claim 11 further comprising an ultraviolet running water processor in said second conduit means for oxidizing ozone gas in the water being returned from said sterilizing chamber bck to said swimming pool to further sterilize said water, a water temperature regulator in said second conduit means, and a chlorine concentration regulator in said second conduit means.

15. An apparatus as claimed in claim 11, wherein said air distribution means comprises a hollow member including a wall containing a plurality of pores therein for distributing said air mixture from inside said hollow member as bubbles into the water in said sterilizing chamber.

16. An apparatus as defined in claim 12, wherein said wet cyclone includes spray means for spraying water into the air in said cyclone to remove said dust, bacteria and odors.

* * * * *